United States Patent [19]
Yoo et al.

[11] Patent Number: 5,574,110
[45] Date of Patent: Nov. 12, 1996

[54] PROCESSES FOR PREPARING POLYMERIC GLOSS MODIFIERS AND THERMOPLASTIC RESIN COMPOUNDS CONTAINING SAME

[75] Inventors: Jin-Nyoung Yoo; Dong-Ok Kim; Yeong-Rae Chang; Myung-Man Kim; Jong-Kee Yeo, all of Daejeon, Rep. of Korea

[73] Assignee: Lucky Limited, Seoul, Rep. of Korea

[21] Appl. No.: 229,971

[22] Filed: Apr. 19, 1994

[30] Foreign Application Priority Data

Apr. 22, 1993 [KR] Rep. of Korea .................. 93-6819
Oct. 20, 1993 [KR] Rep. of Korea ................. 93-22080

[51] Int. Cl.$^6$ .................. C08F 257/02; C08F 265/06; C08L 51/00
[52] U.S. Cl. .............. 525/296; 525/67; 525/82; 525/309
[58] Field of Search .............. 525/296, 67, 309, 525/82

[56] References Cited

U.S. PATENT DOCUMENTS 3,886,235  5/1975  Tanaka .
5,237,004  8/1993  Wu ............................................. 525/85

FOREIGN PATENT DOCUMENTS

WO94/05715  3/1994  WIPO .

*Primary Examiner*—Vasu S. Jagannathan
*Attorney, Agent, or Firm*—Anderson Kill Olick Oshinsky, P.C.

[57] ABSTRACT

Polymeric gloss modifiers, are prepared by forming polymer latices of a core/shell structure or a multi-layered structure, and coagulating and interparticle crosslinking the polymer latices. Said modifiers are used in preparing a low gloss thermoplastic resin compound.

4 Claims, No Drawings

PROCESSES FOR PREPARING POLYMERIC GLOSS MODIFIERS AND THERMOPLASTIC RESIN COMPOUNDS CONTAINING SAME

FIELD OF THE INVENTION

The present invention relates to processes for preparing polymeric gloss modifiers capable of reducing the surface gloss of a thermoplastic resin such as polyvinyl chloride (PVC). Further, the present invention relates to processes for preparing low gloss thermoplastic resin compounds, which comprise blending a conventional thermoplastic resin with the polymeric gloss modifier obtained in accordance with the inventive process.

BACKGROUND OF THE INVENTION

Various attempts have been made to develop a satisfactory method to reduce the surface gloss of an article shaped from a thermoplastic resin. Some of the proposed solutions include: a method of incorporating inorganic fillers such as silica and calcium carbonate into the thermoplastic resin; and a method of processing thermoplastic resin compounds at a low temperature and the like. However, these techniques tend to adversely affect the physical properties of the final products; and, further, result in a high production cost. In order to overcome the drawbacks mentioned above, a method for incorporating an organic additive such as a polymeric gloss modifier having a lower thermal shrinkability than the thermoplastic base resin into the base resin has been developed. In this method, the crosslinked domain of the polymeric modifier employed as an organic additive has been considered as a significant factor for reducing the surface gloss; and, therefore, main efforts have been focused on the discovery of the optimum range for the crosslinked domain of the modifier resin.

SUMMARY OF THE INVENTION

Accordingly, it is an object of the present invention to provide novel processes for efficiently and economically preparing polymeric gloss modifiers which can effectively reduce the surface gloss of a thermoplastic resin.

It is another object of the present invention to provide a process for preparing a low gloss thermoplastic resin compound, which comprises blending a conventional thermoplastic resin with the polymeric gloss modifier obtained in accordance with the inventive process.

In accordance with one aspect of the present invention, there is provided a process for preparing a polymeric gloss modifier, which comprises:

(A) emulsion polymerizing a monomeric mixture including an aromatic vinyl monomer, an acrylic monomer, a grafting agent and, optionally, a cyanide compound and/or a crosslinking agent to obtain a core latex having a crosslinked structure;

(B) conducting a graft emulsion polymerization of the core latex obtained in step (A) with an addition of a monomeric mixture including an acrylic monomer, an interparticle crosslinking agent and, optionally, an aromatic vinyl monomer and/or a cyanide compound to produce a polymer latex having a core/shell structure; and (C) coagulating and interparticle crosslinking the polymer latex obtained in step (B) with an addition of an acid to obtain the polymeric gloss modifier.

In accordance with another aspect of the present invention, there is provided a process for preparing a polymeric gloss modifier, which comprises:

(A) emulsion polymerizing a monomeric mixture including an acrylic monomer, a cyanide compound and, optionally, an aromatic vinyl monomer to obtain a polymer latex having a linear structure;

(B) conducting a crosslinking emulsion polymerization, in the presence of the linear polymer latex obtained in step (A), of a monomeric mixture including an acrylic monomer, a grafting agent and, optionally, an aromatic vinyl monomer, a cyanide compound and a crosslinking agent to produce a polymer latex having a linear/crosslinked structure;

(C) conducting a graft emulsion polymerization of the polymer latex obtained in step (B) with an addition of an acrylic monomer, an interparticle crosslinking agent and, optionally, a cyanide compound to produce a polymer latex having a multi-layered structure; and (D) coagulating and interparticle crosslinking the multi-layered polymer latex obtained in step (C) with an addition of an acid to obtain the polymeric gloss modifier.

In accordance with a further aspect of the present invention, there is provided a process for preparing a low gloss thermoplastic resin compound, which comprises blending a conventional thermoplastic resin with the polymeric gloss modifier obtained in accordance with any one of the processes of the present invention.

DETAILED DESCRIPTION OF THE INVENTION

In accordance with one aspect of the present invention, a polymeric gloss modifier is prepared by forming polymer latices of a core/shell structure including a crosslinked core portion and a shell portion grafted thereto, and coagulating and interparticle crosslinking the resulting polymer latices to increase the crosslinked domain of the polymer latices in the coagulation step.

Specifically, a monomeric mixture including an aromatic vinyl monomer, an acrylic monomer, a grafting agent and, optionally, a cyanide compound and/or a crosslinking agent is emulsion polymerized to form a core latex having a crosslinked structure which possesses a lower shrinkability than that of a thermoplastic base resin.

The aromatic vinyl monomer may be, for example, styrene, monochlorostyrene, methylstyrene, dimethylstyrene and the like. Exemplary acrylic monomer may include acrylates such as methyl acrylate, ethyl acrylate, n-butyl acrylate, isobutyl acrylate, dodecyl acrylate and 2-ethylhexyl acrylate; and methacrylates such as methyl methacrylate, ethyl methacrylate and n-butyl methacrylate. These monomers may be employed either alone or in combination with other(s).

Representative examples of the grafting agent may include allyl acrylate, allyl methacrylate, diallyl maleate, diallyl fumarate and the like.

Further, as an optional component, a cyanide compound and/or a crosslinking agent may be employed. Representative examples of the cyanide compound may include acrylonitrile and methacrylonitrile. As the crosslinking agent, a compound such as divinylbenzene, alkanepolyol, polyacrylate, ethyleneglycol diacrylate, ethyleneglycol dimethacrylate, butyleneglycol diacrylate, hexanediol diacrylate, hexanediol dimethacrylate, trimethylol propanetriacrylate and the like may be used.

In the above emulsion polymerization step for the preparation of the core latex, the aromatic vinyl monomer may be employed in an amount of up to 70% by weight based on the total weight of the monomers employed; the acrylic monomer may be employed in an amount ranging from 25 to 80% by weight of the total weight of the monomers employed; and the grafting agent may be employed in an amount ranging from 0.05 to 5 parts by weight per 100 parts by weight of the monomers employed.

Further, the cyanide compound and the crosslinking agent, if chosen, may be employed in an amount ranging from 5 to 50% by weight of the total weight of the monomers employed and in an amount ranging from 0.05 to 5 parts by weight per 100 parts by weight of the monomers employed, respectively.

In addition to the above-mentioned monomers, a polymerization initiator, an emulsifier and/or a chain transfer agent may be employed.

As a polymerization initiator, a water soluble initiator such as potassium persulfate and ammonium persulfate, is frequently used, although others conventionally used in emulsion polymerization such as an oil soluble initiator and a redox system may also be employed. Such initiator may preferably be used in an amount ranging from 0.05 to 3 parts by weight per 100 parts by weight of the total monomers used in the polymerization.

An anionic surfactant may be used as an emulsifier in the above emulsion polymerization. Representative examples of such surfactants may include: alkyl aryl sulfonates such as sodium dodecyl benzene sulfonate, sodium alkylbenzene sulfonate and potassium dodecyl benzene sulfonate; alkyl sulfonates such as sodium dodecyl sulfonate and potassium dodecyl sulfonate; sulfates such as sodium dodecyl sulfate, sodium octyl sulfate and sodium octadecyl sulfate; salts of rosin acid such as potassium rosinate and sodium rosinate; and fatty acid salts such as potassium oleate and potassium stearate. Generally, it may be preferably used in an amount of 0.1 to 5 parts by weight per 100 parts by weight of the total monomers used.

Futher, as a chain transfer agent, mercaptans such as t-dodecyl mercaptan and n-dodecyl mercaptan; terpenes such as dipentene and t-terpene; and halogenated hydrocarbons such as chloroform and carbon tetrachloride may be used. It may be suitably used in an amount of up to 6 parts by weight per 100 parts by weight of the total monomers used.

Subsequently, the core latex thus obtained may be subjected to a graft emulsion polymerization in the same reactor to form a polymer latex of a core/shell structure. In the graft polymerization, an acrylic monomer, an interparticle crosslinking agent and, optionally, an aromatic vinyl monomer and/or a cyanide compound are charged into the core latex to conduct the graft emulsion polymerization of the reactants and to thereby graft a shell portion to the core latex.

As an example of the interparticle crosslinking agent used in the graft emulsion polymerization, an acrylamide may be preferably employed and the representative examples of the acrylamide may include N-hydroxyalkyl acrylamide such as N-methylol acrylamide and N-alkylether acrylamide such as N-methylether acrylamide. They may be employed in one kind or in combination with each other, and preferably in an amount ranging from 0.1 to 15% by weight based on the total monomers used.

The acrylic monomer may be employed in an amount ranging from 30 to 100% by weight based on the total monomers employed in the graft polymerization step.

Optionally, an aromatic vinyl monomer may be employed in an amount of up to 50% by weight; and a cyanide compound may be employed in an amount of up to 50% by weight, based on the total monomers employed.

Also, the polymerization initiator, the emulsifier and the chain transfer agent may be employed in an appropriate amount as in the core preparation step.

Both the first and the second emulsion polymerizations may be suitably carried out at a temperature ranging from 50° to 90° C. for a period ranging from 2 to 12 hours.

The core/shell latex prepared by the above two polymerization steps is then subjected to a coagulation step in accordance with a conventional process. In the coagulation step, owing to the action of the interparticle crosslinking agent introduced in the graft polymerization step, the latex particles are coagulated and interparticle-crosslinked with each other to form the polymeric gloss modifier. The novel polymeric gloss modifier has a large crosslinked domain of 0.3 μm or more, in the form of a high molecular weight gel.

The interparticle crosslinking reaction may be carried at a temperature ranging from 50° to 90° C. for a period ranging from 5 minutes to 2 hours and be preferably accelarated under an acidic condition, suitably at a pH ranging from 1 to 6.

Examples of the acid which may be used during the coagulation step include sulfuric acid, chloric acid and the like. Sulfuric acid is preferred.

In accordance with another aspect of the present invention, a polymeric gloss modifier is prepared by forming multi-layered polymer latices and further coagulating and interparticle crosslinking the latices in the coagulation step.

Specifically, a monomeric mixture comprising an acrylic monomer, a cyanide compound and, optionally, an aromatic vinyl monomer is emulsion polymerized to form a polymer latex of a linear structure.

In the above emulsion polymerization step for the preparation of the linear polymer latex, the aromatic vinyl monomer may be employed in an amount of up to 70% by weight; the acrylic monomer may be employed in an amount ranging from 15 to 80% by weight; the cyanide compound, if chosen, may be employed in an amount ranging from 5 to 50% by weight based on the total monomers employed.

In addition to the above-mentioned monomers, a polymerization initiator, a chain transfer agent and an emulsifier may be employed in the above polymerization, as previously described. The initiator, the chain transfer agent and the emulsifier may preferably be used in an amount ranging from 0.05 to 3 parts, 0.05 to 5 parts and 0.1 to 5 parts by weight per 100 parts by weight of the total monomers used in the polymerization, respectively.

Thereafter, the latex of the linear structure thus obtained may be subjected to a crosslinking emulsion polymerization to form a polymer latex of a linear/crosslinked structure. Specifically, an acrylic monomer, a grafting agent and, optionally, an aromatic vinyl monomer, a cyanide compound and a crosslinking agent are charged into the resulting linear structure polymer latex to conduct the crosslinking emulsion polymerization.

In the crosslinking step, the acrylic monomer may be employed in an amount of less than 30% by weight; the cyanide compound may be employed in an amount of up to 50% by weight; and the aromatic vinyl monomer may be employed in an amount of up to 50% by weight, based on the total monomers employed. The crosslinking agent and the grafting agent may be employed in an amount ranging from 0.05 to 5 parts by weight and up to 5 parts by weight, per 100 parts by weight of the total monomers employed, respectively.

Further, the emulsifier, the chain transfer agent and the polymerization initiater may be in an appropriate amount as in the first polymerization, in addition to the above-mentioned monomer.

The polymer latex prepared by the above two polymerization steps is then subjected to a graft emulsion polymerization to form a multi-layered polymer latex. Specifically, an acrylic monomer and, optionally, a cyanide compound and an interparticle crosslinking agent are added to the resulting polymer latex obtained in the two polymerization steps to conduct the graft emulsion polymerization.

In the graft polymerization step, the acrylic monomer may be employed in an amount of up to 100% by weight; the cyanide compound may be employed in an amount of up to 50% by weight; and the interparticle crosslinking agent may be used in an amount ranging from 0.1 to 15% by weight based on the total monomers employed.

Also, the emulsifier, the polymerization initiator and the chain transfer agent may be employed as described previously.

In the above-mentioned three emulsion polymerization steps, the ratio of the total amount of the reactants employed in the three successive steps may be preferably in the range of 5–35%:30–70%:5–50%; and, each of the emulsion polymerizations may be carried out at a temperature ranging from 50° to 90° C. for a period ranging from 2 to 12 hours.

The multi-layered latex prepared by the above three polymerization steps is then subjected to a coagulation step, under the same condition as described previously, to form the polymeric gloss modifier having a high molecular weight.

The polymeric gloss modifier prepared in accordance with the present invention can be blended with a thermoplastic resin under a conventional condition. Suitable examples of the thermoplastic resin may include PVC (polyvinyl chloride), ABS (acrylonitrile butadiene styrene), PC (polycarbonate)/ABS blend, PC/PBT (polybutylene terephthalate) blend and the like. The gloss modifier of the present invention may be employed in an amount ranging from 1 to 10 parts by weight per 100 parts by weight of the thermoplastic resin.

The effect of the gloss modifier prepared in accordance with the present invention for reducing the gloss of a thermoplastic resin was evaluated as follows.

In a Henschel mixer, 100 parts by weight of PVC resin, 3 parts by weight of dibutyltin maleate, 6 parts by weight of dioctyl phthalate, 1 part by weight of polyethylene wax, 10 parts by weight of MB-830C (a product of Lucky Ltd., Korea) as an impact modifier and 5 parts by weight of the gloss modifier of the present invention, such as the one prepared in the following Examples, were blended and dispersed. The resulting mixture was extruded into the form of a pellet using a single screw extruder and then the resulting pellets were injection-molded into specimens of desired shape. The surface gloss of the samples was determined at a degree of 60° using a Glossometer (a product of Toyo Seiki, Japan).

The following Examples are intended to illustrate the present invention more specifically, without limiting the scope of the invention. All units, percentages, parts, etc. as used in the Examples are by weight, unless otherwise specified.

EXAMPLE 1

A 1 L flask was charged with 200 g of water, 2 g of sodium dodecyl sulfate, 0.4 g of potassium persulfate and 100 g of a monomeric mixture consisting of 70% of styrene, 30% of butyl acrylate and 0.5% of allyl methacrylate for the preparation of the core latex. The reaction mixture was polymerized at the temperature of 70° C. for 10 hours with stirring.

Into the core latex so obtained were introduced 99 g of a monomeric mixture consisting of 10% of butyl acrylate and 90% of methyl methacrylate, 1 g of N-methylol acrylamide, 200 g of water, 0.1 g of potassium persulfate and 0.5 g of sodium dodecyl sulfate, and the mixture was reacted at the temperature of 70° C. for 10 hours to prepare a core/shell latex having a 1:1 ratio of the core portion and the shell portion.

300 g of the core/shell latex so prepared was charged into 550 g of 50% aqueous solution of calcium chloride together with 5 g of 5% sulfuric acid at 60° C. The resulting solution was aged at 70° C. for 30 minutes. The resin coagulated was filtered and dried to obtain the resin in the form of powder.

The surface gloss of the resin obtained was measured in accordance with the above-mentioned method and the result is shown in Table 1

EXAMPLE 2

A 1 L flask was charged with 200 g of water, 1 g of sodium dodecyl sulfate, 0.4 g of potassium persulfate and 80 g of a monomeric mixture consisting of 60% of styrene, 40% of butyl acrylate and 0.5% of allyl methacrylate for the preparation of the core latex. The reaction mixture was polymerized at the temperature of 70° C. for 10 hours with stirring.

Into the core latex so obtained were introduced 19 g of methyl methacrylate, 1 g of N-methylol acrylamide, 200 g of water, 0.15 g of potassium persulfate and 2 g of sodium dodecyl sulfate, and the mixture was reacted at the temperature of 70° C. for 10 hours to prepare a core/shell latex having a 8:2 ratio of the core portion and the shell portion.

The latex so prepared was subjected to the same coagulation step as disclosed in Example 1 to obtain the desired resin in the form of powder.

The surface gloss of the resin obtained was measured and the result is also shown in Table 1.

EXAMPLE 3

The procedures described in Example 1 were repeated except that in the core preparation step, the monomer mixture consisting of 35% of styrene, 30% of butyl acrylate, 0.4% of allyl methacrylate, 35% of acrylonitrile and 0.1% of divinylbenzene was employed.

The surface gloss of the resin obtained was measured and the result is also shown in Table 1.

COMPARATIVE EXAMPLE 1

The procedures described in Example 1 were repeated except that N-methylol acrylamide was not employed.

The surface gloss of the resin obtained was measured and the result is also shown in Table 1.

COMPARATIVE EXAMPLE 2

The procedures described in Example 2 were repeated except that, in the coagulation step, the acid was not added to the aqueous calcium chloride solution.

The surface gloss of the resin obtained was measured and the result is also shown in Table 1.

TABLE 1

|  | Example 1 | Example 2 | Example 3 | Com. Ex. 1 | Com. Ex. 2 |
|---|---|---|---|---|---|
| Gloss(60°) | 31.4 | 30.1 | 33.0 | 63.5 | 68.9 |

EXAMPLE 4

A 1 L flask was charged with 200 g of water, 2 g of sodium dodecyl sulfate, 0.4 g of potassium persulfate, 0.5 g of t-dodecylmercaptane and 100 g of a monomeric mixture consisting of 50% of styrene and 50% of butyl acrylate for producing a linear polymer latex. The reaction mixture was polymerized at the temperature of 70° C. for 10 hours with stirring.

Into the latex of linear structure so obtained were introduced 247.5 g of a monomeric mixture consisting of 50% of butyl acrylate and 50% of styrene or crosslinking of the reactants, 2.5 g of N-methylol acrylamide, 3 g of divinylbenzene, 1 g of aryl methacrylate, 500 g of water, 0.25 g of potassium persulfate and 1.25 g of sodium dodecyl sulfate, and the mixture was reacted at the temperature of 70° C. for 10 hours to prepare a latex having a linear structure portion and a crosslinked portion.

To 707 g of the latex so prepared were added 200 g of water, 97.5 g of a monomeric mixture consisting of 80% of methyl methacrylate and 20% of acrylonitrile, 2.5 g of N-methylol acrylamide, 3 g of t-dodecylmercaptan, 0.25 g of potassium persulfate and 1.25 g of sodium dodecyl sulfate, and the resulting mixture was reacted at the temperature of 70° C. for 10 hours to prepare a multi-layered latex.

300 g of the latex so obtained was charged into 550 g of 50% aqueous solution of calcium chloride together with 5 g of 5% sulfuric acid at 60° C. The resulting solution was aged at 70° C. for 30 minutes. The resin so coagulated was filtered and dried to obtain the resin in the form of powder.

The surface gloss of the resin obtained was measured in accordance with the above-mentioned method and the result is shown in Table 2.

EXAMPLE 5

A 1 L flask was charged with 200 g of water, 1 g of sodium dodecyl sulfate, 0.4 g of potassium persulfate, 0.5 g of t-dodecylmercaptan and 100 g of a monomeric mixture consisting of 50% of methyl methacrylate, 30% of butyl acrylate and 20% of acrylonitrile for preparing a linear polymer latex. The reaction mixture was polymerized at the temperature of 70° C. for 10 hours with stirring.

Into the latex of linear structure so obtained were introduced 165.3 g of a monomeric mixture consisting of 30% of butyl acrylate, 50% of methyl methacrylate and 20% of acrylonitrile for crosslinking of the reactants, 2 g of N-methylol acrylamide, 2 g of hexanediol acrylate, 0.8 g of allyl methacrylate, 340 g of water, 0.2 g of potassium persulfate and 1.2 g of sodium dodecyl sulfate, and the mixture was reacted at the temperature of 70° C. for 10 hours to prepare a latex having a linear structure portion and a crosslinked portion.

To 1212 g of the latex so prepared were added 200 g of water, 97.5 g of methyl methacrylate, 2.5 g of N-methylol acrylamide, 3 g of t-dodecylmercaptane, 0.25 g of potassium persulfate and 1.25 g of sodium dodecyl sulfate, and the resulting mixture was reacted at the temperature of 70° C. for 10 hours to prepare a multi-layered latex.

The latex so obtained was subjected to the same coagulation step as disclosed in Example 4 to obtain the desired resin in the form of powder.

The surface gloss of the resin obtained was measured and the result is also shown in Table 2.

COMPARATIVE EXAMPLE 3

The procedures described in Example 4 were repeated except that N-methylol acrylamide was not used in the grafting step.

The surface gloss of the resin obtained was measured and the result is also shown in Table 2.

COMPARATIVE EXAMPLE 4

The procedures described in Example 5 were repeated except that the acid was not added to the aqueous calcium chloride solution during the coagulation process.

The surface gloss of the resin obtained was measured and the result is also shown in Table 2.

TABLE 2

|  | Example 4 | Example 5 | Com. Ex. 3 | Com. Ex. 4 |
|---|---|---|---|---|
| Gloss(60°) | 28.4 | 20.3 | 70.1 | 40.3 |

As can be seen in the Tables 1 and 2, the gloss of PVC blended with the resins prepared in Examples 1 to 5 in accordance with the present invention was reduced considerably, compared with that of PVC blended with the resins prepared in Comparative Examples 1 to 4 in which the interparticle crosslinking agent or the acid is not employed.

While the invention has been described in connection with the specific embodiments contained herein, it should be recognized that various modifications and changes which may be apparent to those skilled in the art to which the invention pertains may be made and also fall within the scope of the invention as defined by the claims that follow.

What is claimed is:

1. A process for preparing a polymeric gloss modifier, which comprises:

(A) Optionally emulsion polymerizing a monomeric mixture including an acrylic monomer, an ethylenically unsaturated cyanide compound and, optionally, an aromatic vinyl monomer to obtain a polymeric latex having a linear structure;

(B) emulsion polymerizing a monomeric mixture including an aromatic vinyl monomer, an acrylic monomer, an ethylenically unsaturated grafting agent and, optionally, the linear polymer latex obtained in step (A), an ethylenically unsaturated cyanide compound, and/or an ethylenically unsaturated crosslinking agent to obtain a core latex having a crosslinked structure;

(C) conducting a graft emulsion polymerization of the core latex obtained in step (B) with an addition of a monomeric mixture including an acrylic monomer, an interparticle crosslinking agent and, optionally, an aromatic vinyl monomer and/or an ethylenically unsaturated cyanide compound to produce a polymer latex having a core/shell structure; and (D) coagulating and interparticle crosslinking the polymer latex obtained in step (C) with an addition of an acid to obtain the polymeric gloss modifier.

2. The process of claim 1, wherein the interparticle crosslinking agent is N-hydroxyalkyl acrylamide or N-alkylether acrylamide.

3. The process of claim 1, wherein the interparticle crosslinking agent is employed in an amount ranging from 0.1 to 15% by weight based on the total weight of the monomers.

4. A low gloss thermoplastic resin compound prepared by blending the polymeric gloss modifier recited in claim 1 with a thermoplastic resin.

* * * * *